United States Patent
Choi et al.

(10) Patent No.: US 12,506,771 B2
(45) Date of Patent: Dec. 23, 2025

(54) METHOD FOR COUNTERING ASYNCHRONOUS ATTACK ON SUPPLY CHAIN SECURITY PROTOCOL AND APPARATUS USING THE SAME

(71) Applicant: ELECTRONICS AND TELECOMMUNICATIONS RESEARCH INSTITUTE, Daejeon (KR)

(72) Inventors: Yong-Je Choi, Daejeon (KR); Dae-Won Kim, Daejeon (KR); Sang-Su Lee, Daejeon (KR); Byeong-Cheol Choi, Daejeon (KR); Seung-Kwang Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 95 days.

(21) Appl. No.: 18/398,643

(22) Filed: Dec. 28, 2023

(65) Prior Publication Data
US 2024/0406209 A1 Dec. 5, 2024

(30) Foreign Application Priority Data
May 31, 2023 (KR) .......................... 10-2023-0070024

(51) Int. Cl.
*H04L 9/40* (2022.01)
(52) U.S. Cl.
CPC ...... *H04L 63/1441* (2013.01); *H04L 63/1416* (2013.01)
(58) Field of Classification Search
None
See application file for complete search history.

(56) References Cited

U.S. PATENT DOCUMENTS

| | | | |
|---|---|---|---|
| 11,176,338 B1 * | 11/2021 | Collins, III | G06F 21/86 |
| 2010/0082513 A1 * | 4/2010 | Liu | H04L 63/1458 706/46 |
| 2012/0066764 A1 * | 3/2012 | Kim | H04L 63/101 380/279 |

(Continued)

FOREIGN PATENT DOCUMENTS

KR 10-2012-0010604 A 2/2012

OTHER PUBLICATIONS

Chenglu Jin et al., "Secure and Efficient Initialization and Authentication Protocols for SHIELD," IEEE Transactions on Dependable and Secure Computing, Jan./Feb. 2019.

*Primary Examiner* — Christopher C Harris (57) ABSTRACT

Disclosed herein are a method for countering an asynchronous attack on a supply chain security protocol and an apparatus for the same. The method includes, in a supply chain security protocol performed by a terminal device into which a dielet is inserted and an authentication server, performing a self-generation mode in which a counter value within the dielet is registered in the authentication server, performing a read-out mode in which whether an asynchronous attack occurs is detected by comparing the counter values respectively stored in the dielet and the authentication server when a message for communication is sent, and replacing a message for the communication with a random value when an asynchronous attack is detected.

15 Claims, 7 Drawing Sheets

(56) References Cited

U.S. PATENT DOCUMENTS

| | | |
|---|---|---|
| 2012/0161936 A1 | 6/2012 | Yoon et al. |
| 2013/0160086 A1* | 6/2013 | Katar ............... H04L 67/51 |
| | | 726/4 |
| 2021/0012073 A1 | 1/2021 | Suko et al. |
| 2021/0182436 A1 | 6/2021 | Bennison |
| 2021/0203505 A1 | 7/2021 | Mossler et al. |
| 2022/0210164 A1 | 6/2022 | Lim et al. |
| 2023/0067338 A1* | 3/2023 | Zhong ............... H04L 69/321 |

* cited by examiner

METHOD FOR COUNTERING ASYNCHRONOUS ATTACK ON SUPPLY CHAIN SECURITY PROTOCOL AND APPARATUS USING THE SAME

CROSS REFERENCE TO RELATED APPLICATION

This application claims the benefit of Korean Patent Application No. 10-2023-0070024, filed May 31, 2023, which is hereby incorporated by reference in its entirety into this application.

BACKGROUND OF THE INVENTION

1. Technical Field

The present disclosure relates generally to technology for countering an asynchronous attack on a supply chain security protocol, and more particularly to technology for defending against an asynchronous attack on a SHIELD protocol for protecting an Integrated Circuit (IC) supply chain.

2. Description of the Related Art

A Supply Chain Hardware Integrity for Electronics Defense (SHIELD) protocol is a protocol for protecting IC chips from threats that can occur in an IC supply chain, such as cloning, counterfeiting, overproduction, distribution of defective chips, recycling, and the like, and is performed in such a way that, after a root of trust and a dielet are inserted into a host package, an authentication protocol is performed. Here, the dielet contains a secret key of symmetric key encryption to be used for confidentiality and authentication of communication, log information for detecting malicious behavior, a sensor status bit, and the like.

Generally, communication components for the SHIELD protocol include a dielet, a smart device, and a server. The dielet is implemented in the form of a passive tag, and performs an authentication protocol via a trusted device working as an intermediary for communication with the server. Here, the trusted device is assumed to be a smartphone.

Here, a protocol that is modified to apply a Counter (CTR) operation mode to Advanced Encryption Standard (AES) in order to counter a try-and-check attack and a Distributed Denial of Service (DDOS) attack on the SHIELD protocol is referred to as a CTR-SHIELD protocol.

However, when a final message between a dielet and an authentication server is blocked due to a malicious purpose while the CTR-SHIELD protocol is being performed, this results in asynchrony of counter information input to the AES operation mode, and the availability of a host package is lost.

Documents of Related Art (Patent Document 1) U.S. Patent Application Publication US2021/0182436, published on Jun. 17, 2021 and titled "System and method for providing security services with multi-function supply chain hardware integrity for electronics defense (SHIELD)".

SUMMARY OF THE INVENTION

An object of the present disclosure is to compensate for vulnerabilities to an asynchronous attack on a CTR-SHIELD protocol.

Another object of the present disclosure is to modify a read-out mode of an existing security protocol so that the degree of asynchrony of counter information between a dielet and a server is prevented from becoming equal to or greater than a threshold.

A further object of the present disclosure is to prevent availability of a dielet from being permanently lost due to exhaustion of a counter value.

In order to accomplish the above objects, a method for countering an asynchronous attack on a supply chain security protocol according to the present disclosure includes, in a supply chain security protocol performed by a terminal device into which a dielet is inserted and an authentication server, performing a self-generation mode in which a counter value within the dielet is registered in the authentication server, performing a read-out mode in which whether an asynchronous attack occurs is detected by comparing the counter values respectively stored in the dielet and the authentication server when sending a message for communication, and replacing a message for the communication with a random value when an asynchronous attack is detected.

Here, in the self-generation mode, the identifier of the dielet and a secret key (K) of symmetric key encryption may be registered in the authentication server along with the counter value within the dielet.

Here, in the read-out mode, the difference between a first counter value stored in the dielet and a second counter value that is stored in the authentication server by being matched to the identifier may be calculated, and it may be determined that an asynchronous attack occurs when the absolute value of the difference is greater than a preset threshold.

Here, in the read-out mode, the authentication server may retrieve the second counter value by acquiring the identifier from the message and generate a response message by encrypting the second counter value and a random value, and the dielet may calculate the difference by decrypting the response message based on the secret key.

Here, the method may further include synchronizing, by the authentication server, the second counter value based on sensor status bits information received from the dielet when no asynchronous attack is detected and performing an authentication mode in which whether the synchronized second counter value is greater than a preset number of times of authentication is verified.

Here, the sensor status bits information may include information acquired by encrypting the first counter value within the dielet and a random number.

Here, in the authentication mode, the authentication server may acquire the first counter value by decrypting the sensor status bits information based on the secret key and synchronize the second counter value to match the acquired first counter value.

Here, a message between the dielet and the authentication server may be transferred via the terminal device.

Also, a dielet for a supply chain security protocol according to an embodiment of the present disclosure includes a processor for performing a self-generation mode in which an internal counter value is registered in an authentication server of the supply chain security protocol, performing a read-out mode in which whether an asynchronous attack occurs is detected by comparing the internal counter value with a counter value stored in the authentication server when sending a message for communication, and replacing a message for the communication with a random value when an asynchronous attack is detected; and memory for storing the counter value, an identifier, and a secret key (K) of symmetric key encryption.

Here, in the self-generation mode, the identifier and the secret key (K) may be registered in the authentication server along with the internal counter value.

Here, in the read-out mode, the difference between a first counter value corresponding to the internal counter value and a second counter value that is stored in the authentication server by being matched to the identifier may be calculated, and it may be determined that an asynchronous attack occurs when the absolute value of the difference is greater than a preset threshold.

Here, in the read-out mode, the second counter value may be acquired by decrypting a response message received from the authentication server based on the secret key.

Here, the response message may be an encrypted message including a random number generated in the authentication server and the second counter value.

Here, the processor may generate sensor status bits information and send the same to the authentication server when no asynchronous attack is detected, and the authentication server may synchronize the second counter value based on the sensor status bits information and perform an authentication mode in which whether the synchronized second counter value is greater than a preset number of times of authentication is verified.

Here, the sensor status bits information may include information acquired by encrypting the first counter value and the random number.

Here, the authentication server may acquire the first counter value by decrypting the sensor status bits information based on the secret key and synchronize the second counter value to match the acquired first counter value in the authentication mode.

Here, the dielet may be inserted into a terminal device, and a message between the dielet and the authentication server may be transferred via the terminal device.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Hereinafter, a preferred embodiment of the present disclosure will be described in detail with reference to the accompanying drawings.

Figure 1:
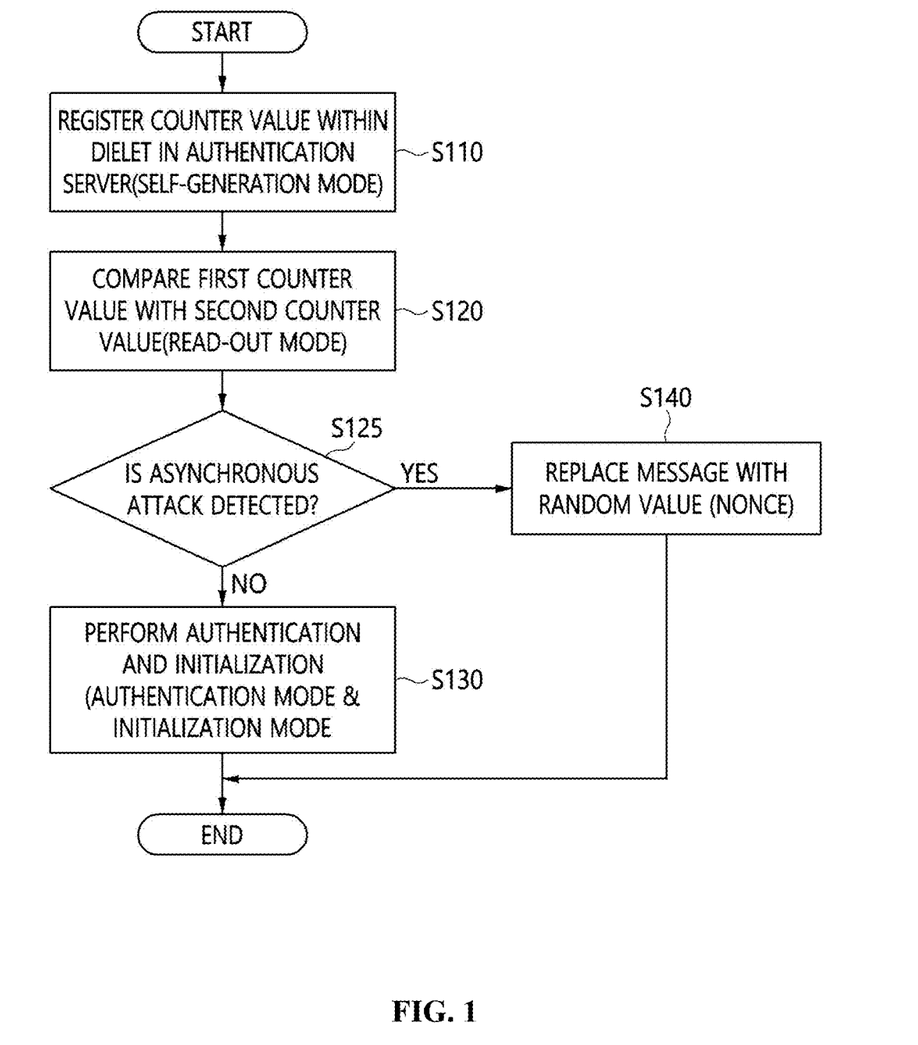
FIG. 1 is a flowchart illustrating a method for countering an asynchronous attack on a supply chain security protocol according to an embodiment of the present disclosure.

FIG. 1 is a flowchart illustrating a method for countering an asynchronous attack on a supply chain security protocol according to an embodiment of the present disclosure.

Referring to FIG. 1, in the method for countering an asynchronous attack on a supply chain security protocol according to an embodiment of the present disclosure, a self-generation mode in which a counter value contained in a dielet is registered in an authentication server is performed at step S110 in a supply chain security protocol performed by a terminal device into which the dielet is inserted and the authentication server.

Here, in the self-generation mode, the identifier of the dielet and a secret key K of symmetric key encryption may be registered in the authentication server along with the counter value within the dielet.

For example, a CTR-SHIELD protocol, which is a supply chain security protocol, is configured such that, when a dielet sends a serial ID to a smartphone, the smartphone may reply to the dielet with part of the serial ID and a nonce value to be used to configure an authentication message. This is for countering a specific batch mode Denial-of-Service (DOS) attack.

Figure 2:
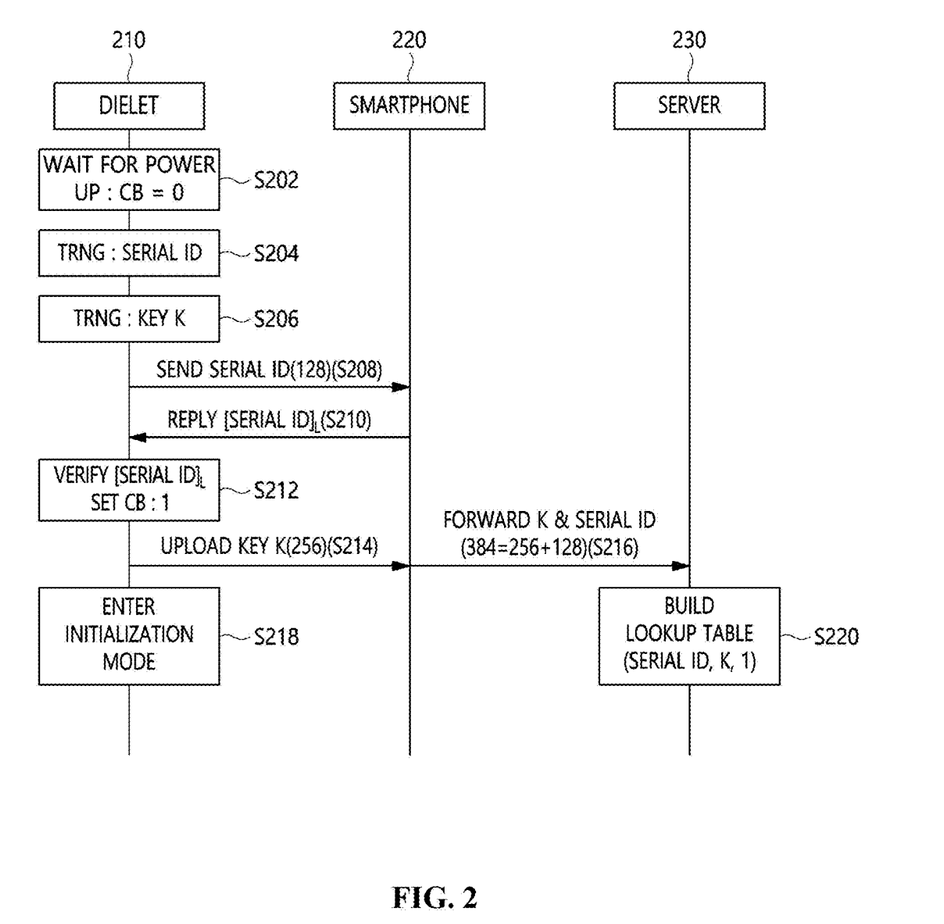
FIG. 2 is a view illustrating an example of a self-generation mode according to the present disclosure.

Here, the self-generation mode illustrated in FIG. 2 shows a process of registering information of a dielet 210 in an authentication server 230.

Referring to FIG. 2, when the dielet 210 is powered up, a first counter value CB therein may be initialized to 0 at step S202.

Subsequently, a serial ID, which is the identifier of the dielet 210, and a secret key K may be generated using a True Random Number Generator (TRNG) at steps S204 and S206.

Subsequently, when the dielet 210 transfers the serial ID to a smartphone 220, which is a trusted terminal device, at step S208, the smartphone 220 may reply to the dielet 210 with the first L bits of the serial ID at step S210.

Subsequently, the dielet 210 may confirm the first L bits of the serial ID, which are received from the smartphone 220, and set the first counter value CB therein to 1 at step S212.

Subsequently, when the dielet 210 uploads the secret key K to the smartphone 220 at step S214, the smartphone 220 may forward the secret key K and the serial ID to the authentication server 230 at step S216.

Subsequently, the dielet 210 may perform an initialization mode for initialization at step S218, and the authentication server 230 may build a lookup table and store the serial ID of the dielet 210, the secret key K, and a second counter value set to 1 such that they are matched to each other at step S220.

Figure 3:
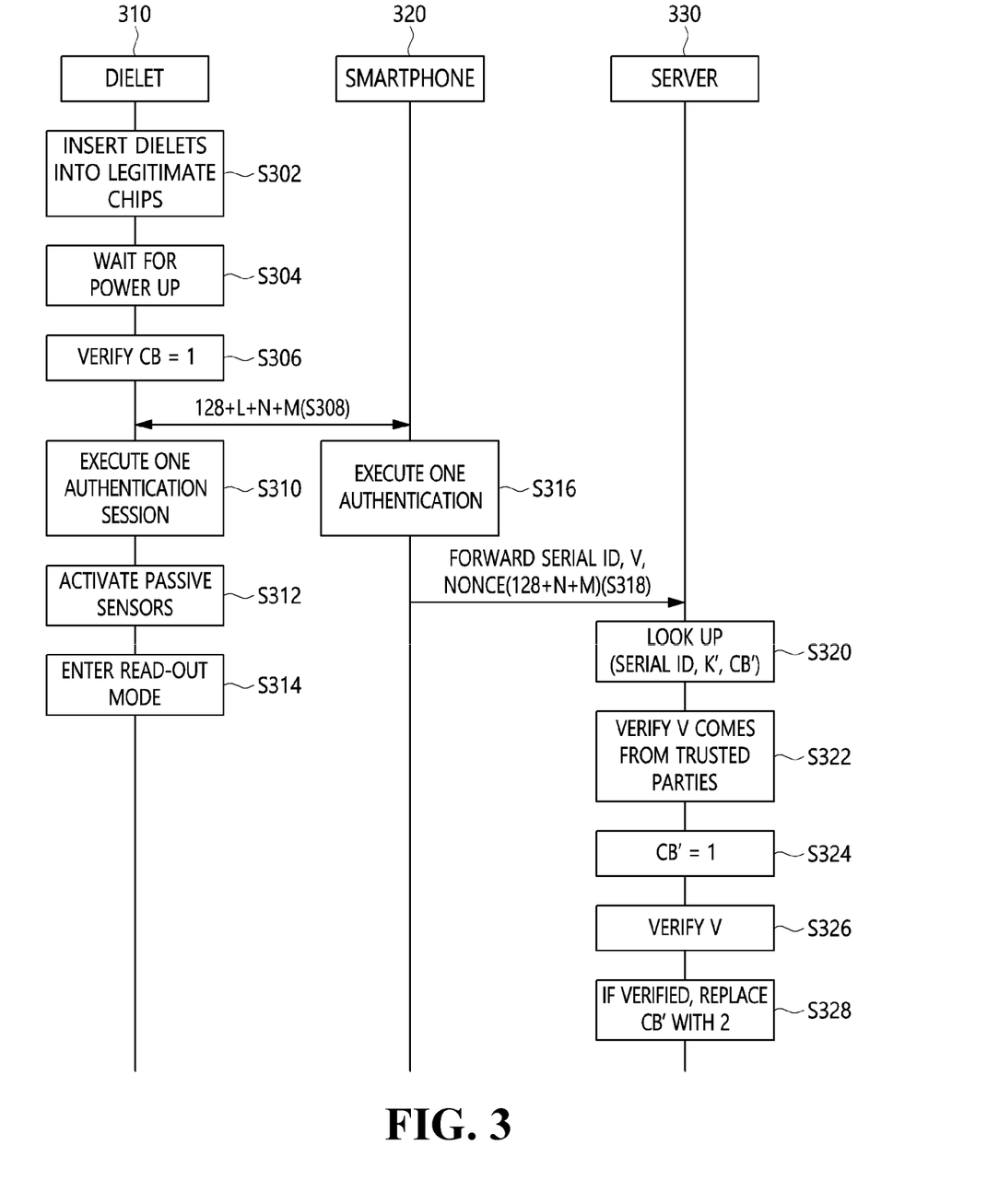
FIG. 3 is a view illustrating an example of an initialization mode according to the present disclosure.

Here, the initialization mode for initialization may be performed as shown in the example illustrated in FIG. 3.

For example, referring to FIG. 3, first, a dielet is inserted into a legitimate chip at step S302 and power-up may be waited for at step S304 in the initialization mode for initialization.

Subsequently, a first counter value CB within the dielet is checked at step S306, and a read-out mode is performed by sending/receiving data between the dielet 310 and a smartphone 320 at step S308, whereby a process of identifying a communication target that intends to counter a batch mode Denial-of-Service (DOS) attack may be performed.

Figure 4:
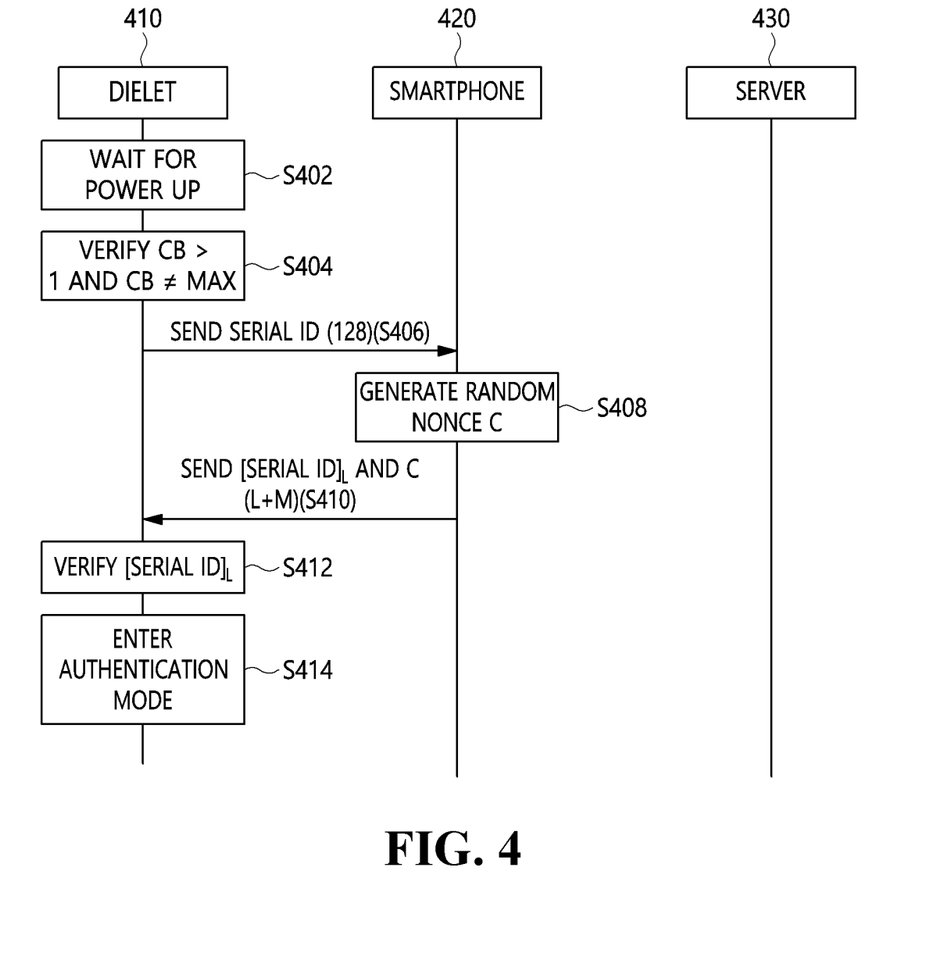
FIG. 4 is a view illustrating an example of an existing read-out mode.

Here, in the read-out mode of the existing CTR-SHIELD protocol, a smartphone 420 returns the first L bits of a serial ID, received from a dielet 410 at step S406, to the dielet 410 at step S410 along with a random number C generated by the smartphone 420 at step S408, as illustrated in FIG. 4.

However, in order to detect whether an asynchronous attack that can occur in this process actually occurs, the present disclosure modifies the existing protocol, which is configured to exchange messages between a dielet and a smartphone in the process of performing the read-out mode, so as to check the counter information of the corresponding dielet stored in an authentication server.

The modification related to this will be described in detail below through step S120 in FIG. 1.

Also, in the method for countering an asynchronous attack on a supply chain security protocol according to an embodiment of the present disclosure, a read-out mode in which whether an asynchronous attack occurs is detected by comparing the counter values respectively stored in the dielet and the authentication server is performed at step S120 when a message for communication is sent.

Here, the messages between the dielet and the authentication server may be transferred via the terminal device.

Here, in the read-out mode, the difference between the first counter value stored in the dielet and the second counter value that is stored in the authentication server by being matched to the identifier is calculated, and when the absolute value of the difference is greater than a preset threshold, it may be determined that an asynchronous attack occurs.

Here, in the read-out mode, the authentication server may retrieve the second counter value by acquiring the identifier from the message and generate a response message by encrypting the second counter value together with a random number.

Here, the dielet may calculate the difference by decrypting the response message based on the secret key.

Subsequently, whether an asynchronous attack is detected is determined at step S125, and when no asynchronous attack is detected, an authentication mode is performed at step S130.

Here, the authentication server may synchronize the second counter value based on sensor status bits information received from the dielet and perform the authentication mode in which whether the synchronized second counter value is greater than a preset number of times of authentication is verified.

Here, the sensor status bits information may include information acquired by encrypting the first counter value within the dielet and the random number.

Here, in the authentication mode, the authentication server may acquire the first counter value by decrypting the sensor status bits information based on the secret key and synchronize the second counter value to match the acquired first counter value.

Also, when it is determined at step S125 that an asynchronous attack is detected, a communication message is replaced with a random value (a nonce value) at step S140.

That is, when the absolute value of the difference between the first counter value stored in the dielet and the second counter value that is stored in the authentication server by being matched to the identifier is greater than a preset threshold, it may be determined that a host package is under an asynchronous attack. Here, in order to prevent the counter of the dielet from being completely exhausted or to prevent the availability thereof from being permanently damaged, all protocol messages may be replaced with a random value.

Figure 5:
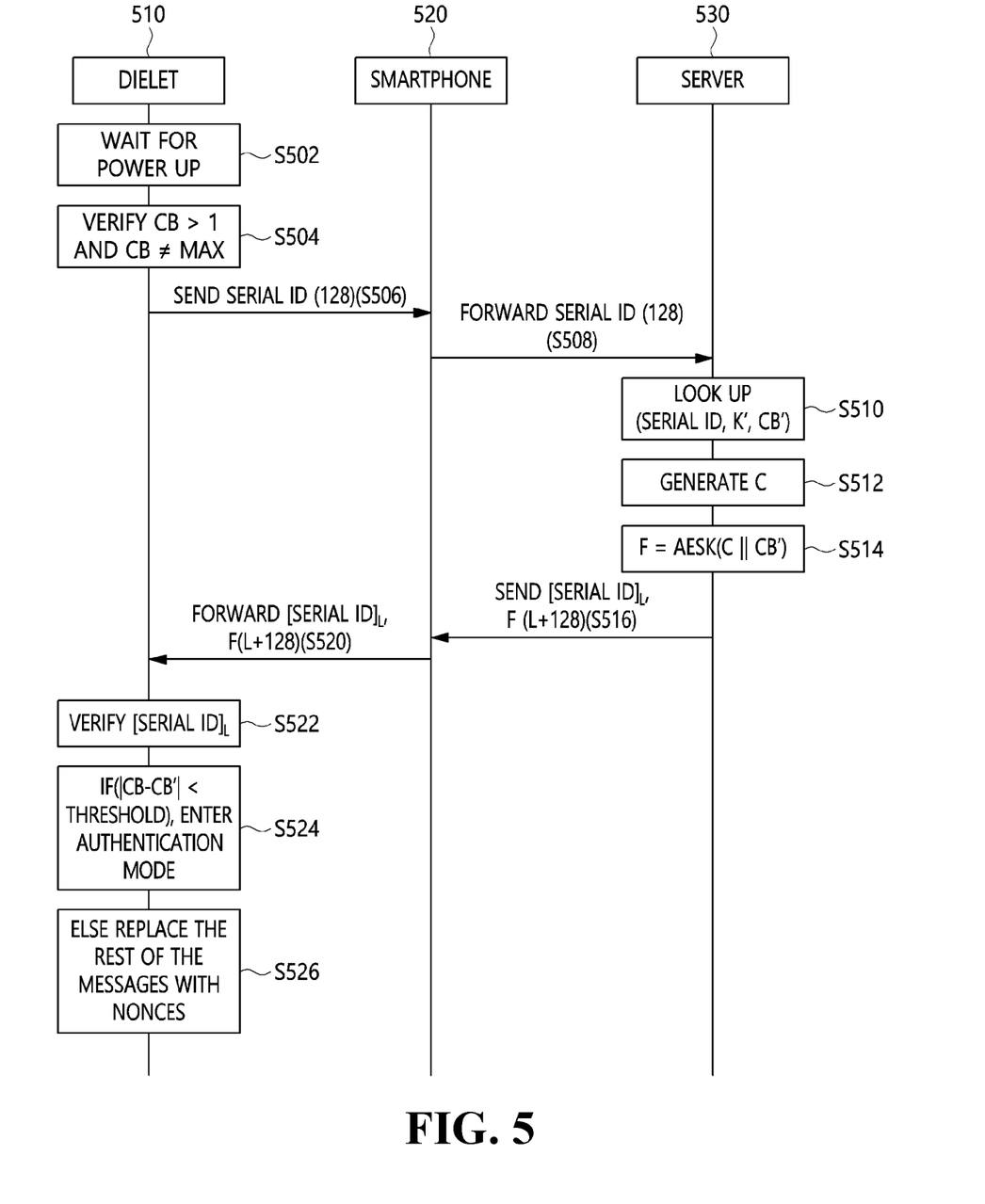
FIG. 5 is a view illustrating an example of a read-out mode according to the present disclosure.

For example, referring to FIG. 5, when a dielet 510 is powered up at step S502, whether a first counter value CB within the dielet 510 is greater than 1 and is not greater than a preset number of times of authentication (MAX) may be checked at step S504 in the read-out mode according to an embodiment of the present disclosure.

When the first counter value is determined to be available at step S504, the dielet 510 transfers a serial ID to a smartphone 520 at step S506, and the smartphone 520 may forward the serial ID to an authentication server 530 at step S508.

Subsequently, the authentication server 530 retrieves the received serial ID from a lookup table, thereby acquiring a secret key K' and a second counter value CB' that are matched to the serial ID at step S510.

Subsequently, the authentication server 530 may generate a random number C at step S512, encrypt the second counter value CB' and the random number C at step S514, and send the same to the smartphone at step S516.

Subsequently, when the smartphone 520 forwards the encrypted second counter value CB' and random number C to the dielet 510 at step S520, the dielet 510 decrypts the received message, thereby verifying the serial ID at step S522.

Subsequently, the absolute value of the difference between the first counter value CB and the second counter value CB' (|CB−CB'|) is calculated, and it may be determined whether the calculated value is greater than a preset threshold.

When the absolute value (|CB−CB'|) is not greater than the preset threshold, the authentication mode is entered at step S524, whereas when the absolute value is greater than the preset threshold, all subsequent messages are replaced with a random number having a predefined length, whereby the first counter value CB may be prevented from being exhausted by an asynchronous attack at step S526.

Figure 6:
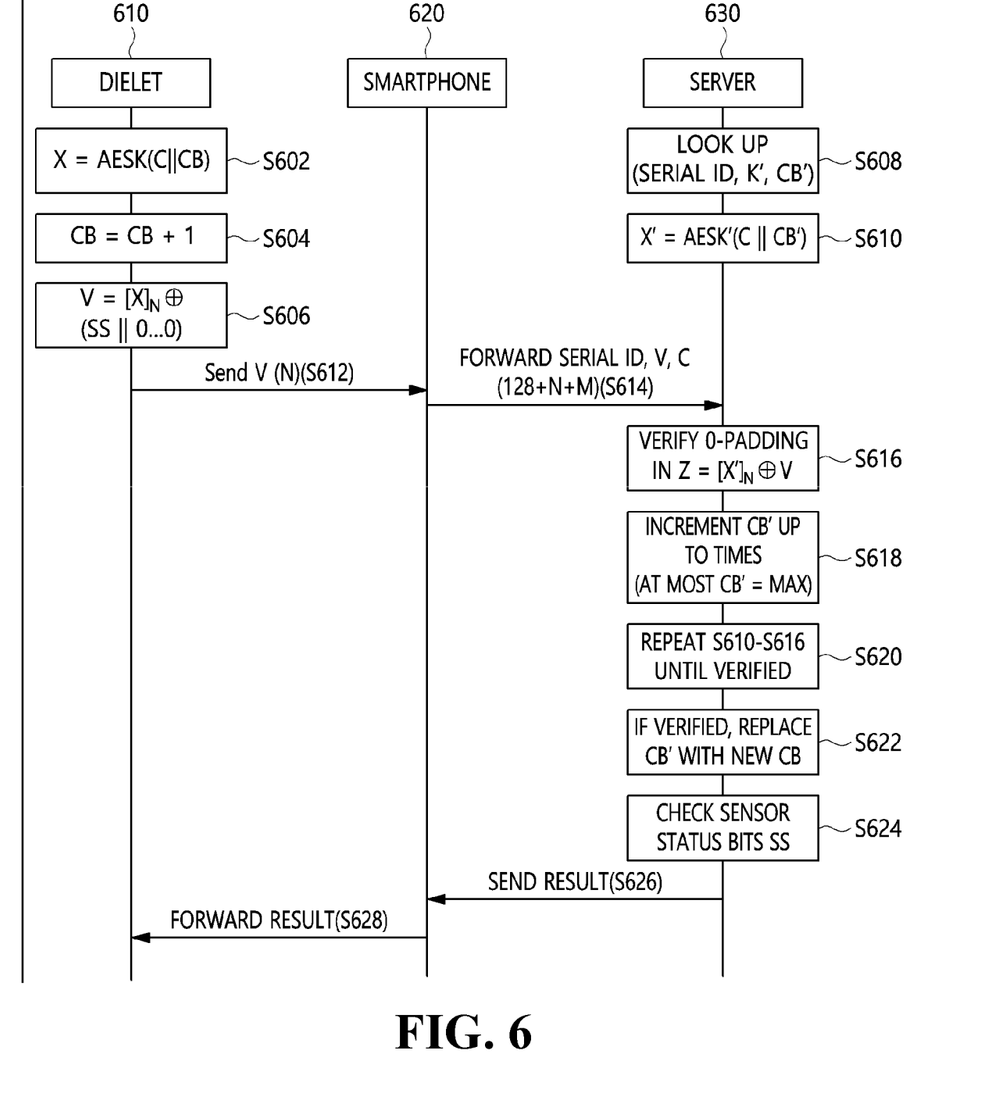
FIG. 6 is a view illustrating an example of an authentication mode according to the present disclosure.

That is, when the condition '|CB−CB'|<threshold' at step S524 is satisfied, authentication may be performed according to the existing protocol specification, as illustrated in FIG. 6.

For example, referring to FIG. 6, a dielet 610 may generate sensor status bits information V by encrypting a random number C sent by an authentication server 630 and a first counter value CB at step S602 in the authentication mode.

Subsequently, when the dielet 610 sends the sensor status bits information to the authentication server 630 via a smartphone 620 at steps S612 and S614, the authentication server 630 may restore the sensor status bits information at step S616.

Here, the counter information between the dielet 610 and the authentication server 630 is synchronized in this process, and whether a second counter value CB' is greater than a preset number of times of authentication (MAX) may be verified at steps S618 to S622.

In this way, whether a malicious attack including counterfeiting is attempted is detected, and simultaneously, authentication may be attempted by checking whether the dielet 610 has a correct secret key at step S624.

That is, according to the present disclosure, a random number that used to be generated by a smartphone, which is a trusted terminal device, is changed to be generated by an authentication server, and when the random number is sent, counter information stored in the authentication server may be encrypted along with the random number. Accordingly, a dielet may prevent the degree of asynchrony of the counter information between the dielet and an authentication server from becoming equal to or greater than a threshold. This may contribute to prevention of permanent loss of the availability of the dielet due to exhaustion of the counter value.

Through the above-described method for countering an asynchronous attack on a supply chain security protocol, vulnerabilities to an asynchronous attack on a supply chain security protocol may be compensated for.

Also, a read-out mode of an existing security protocol is modified, whereby the degree of asynchrony of counter information between a dielet and a server may be prevented from becoming equal to or greater than a threshold.

Also, availability of a dielet may be prevented from being permanently lost due to exhaustion of a counter value.

Figure 7:
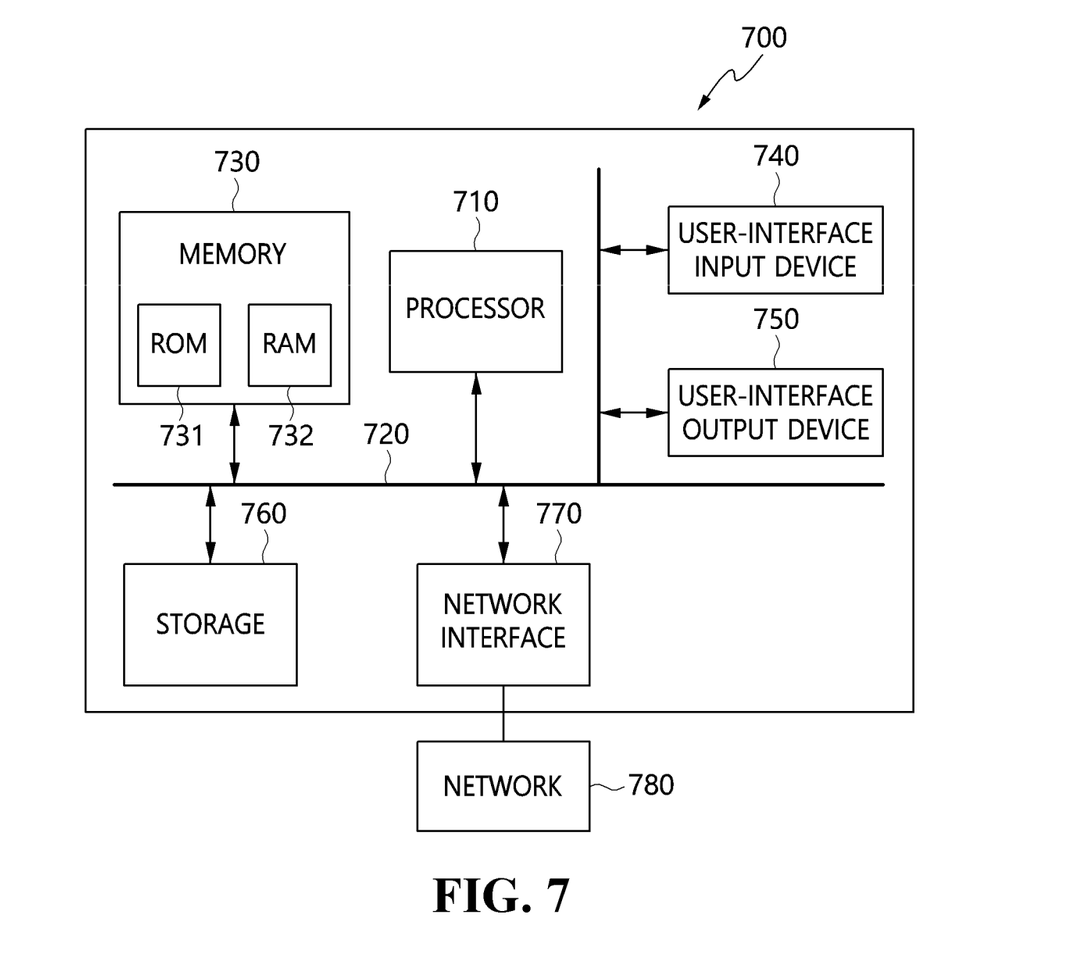
FIG. 7 is a view illustrating a dielet for a supply chain security protocol according to an embodiment of the present disclosure.

FIG. 7 is a view illustrating a dielet for a supply chain security protocol according to an embodiment of the present disclosure.

Referring to FIG. 7, the dielet for a supply chain security protocol according to an embodiment of the present disclosure may be implemented in a computer system including a computer-readable recording medium. As illustrated in FIG. 7, the computer system 700 may include one or more processors 710, memory 730, a user-interface input device 740, a user-interface output device 750, and storage 760, which communicate with each other via a bus 720. Also, the computer system 700 may further include a network interface 770 connected to a network 780. The processor 710 may be a central processing unit or a semiconductor device for executing processing instructions stored in the memory 730 or the storage 760. The memory 730 and the storage 760 may be any of various types of volatile or nonvolatile storage media. For example, the memory may include ROM 731 or RAM 732.

Accordingly, an embodiment of the present disclosure may be implemented as a non-transitory computer-readable medium in which methods implemented using a computer or instructions executable in a computer are recorded. When the computer-readable instructions are executed by a processor, the computer-readable instructions may perform a method according to at least one aspect of the present disclosure.

The processor 710 performs a self-generation mode in which an internal counter value is registered in an authentication server of a supply chain security protocol.

Here, in the self-generation mode, an identifier and a secret key K of symmetric key encryption may be registered in the authentication server along with the internal counter value.

Also, the processor 710 performs a read-out mode in which whether an asynchronous attack occurs is detected by comparing the internal counter value with the counter value stored in the authentication server when a message for communication is sent.

Here, the dielet is inserted into a terminal device, and messages between the dielet and the authentication server may be transferred via the terminal device.

Here, in the read-out mode, the difference between a first counter value corresponding to the internal counter value and a second counter value that is stored in the authentication server by being matched to the identifier may be calculated, and when the absolute value of the difference is greater than a threshold, it may be determined that an asynchronous attack occurs.

Here, in the read-out mode, a response message received from the authentication server is decrypted based on the secret key, whereby the second counter value may be acquired.

Here, the response message may be an encrypted message including a random number generated in the authentication server and the second counter value.

Here, the processor 710 may generate sensor status bits information and send the same to the authentication server when no asynchronous attack is detected.

Here, the authentication server may synchronize the second counter value based on the sensor status bits information and perform an authentication mode in which whether the synchronized second counter value is greater than a preset number of times of authentication is verified.

Here, the sensor status bits information may include information acquired by encrypting the first counter value and the random number.

Here, the authentication server may acquire the first counter value by decrypting the sensor status bits information based on the secret key and synchronize the second counter value to match the acquired first counter value in the authentication mode.

Also, the processor 710 replaces a communication message with a random value when an asynchronous attack is detected.

The memory 730 stores the counter value, the identifier, and the secret key K of symmetric key encryption.

Also, the memory 730 stores various kinds of information and log information generated in the dielet according to an embodiment of the present disclosure, as described above.

According to an embodiment, the memory 730 may support the function for countering an asynchronous attack on a supply chain security protocol. Here, the memory 730 may operate as separate mass storage, and may include a control function for performing operations.

Meanwhile, the dielet includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable medium. In different embodiments, the storage device may include, for example, a hard-disk device, an optical disk device, or any other kind of mass storage device.

Through the above-described dielet for a supply chain security protocol, vulnerabilities to an asynchronous attack on the supply chain security protocol may be compensated for.

Also, the read-out mode of an existing security protocol is modified, whereby the degree of asynchrony of counter information between a dielet and a server may be prevented from becoming equal to or greater than a threshold.

Also, availability of a dielet may be prevented from being permanently lost due to exhaustion of a counter value.

According to the present disclosure, vulnerabilities to an asynchronous attack on a supply chain security protocol may be compensated for.

Also, the present disclosure may modify a read-out mode of an existing security protocol so that the degree of asynchrony of counter information between a dielet and a server is prevented from becoming equal to or greater than a threshold.

Also, the present disclosure may prevent availability of a dielet from being permanently lost due to exhaustion of a counter value.

As described above, the method for countering an asynchronous attack on a supply chain security protocol and the apparatus for the same according to the present disclosure are not limitedly applied to the configurations and operations of the above-described embodiments, but all or some of the embodiments may be selectively combined and configured, so the embodiments may be modified in various ways.

What is claimed is:

1. A method for countering an asynchronous attack on a supply chain security protocol, the method comprising:
    in a supply chain security protocol performed by a terminal device into which a dielet is inserted and an authentication server,
    performing a self-generation mode in which a counter value within the dielet is registered in the authentication server;
    performing a read-out mode that detects whether an asynchronous attack has occurred by comparing counter values respectively stored in the dielet and the authentication server when a message for communication is sent; and
    replacing a message for the communication with a random value when the asynchronous attack is detected,
    wherein in the read-out mode, a difference between a first counter value stored in the dielet and a second counter value stored in the authentication server is calculated, and it is determined that the asynchronous attack has occurred when an absolute value of the difference is greater than a preset threshold.

2. The method of claim 1, wherein in the self-generation mode, an identifier of the dielet and a secret key (K) of symmetric key encryption are registered in the authentication server along with the first counter value within the dielet.

3. The method of claim 2, wherein in the read-out mode, the authentication server retrieves the second counter value by acquiring the identifier from the message and generates a response message by encrypting the second counter value and a random value, and
    the dielet calculates the difference by decrypting the response message based on the secret key.

4. The method of claim 3, further comprising:
    synchronizing, by the authentication server, the second counter value based on sensor status bits information received from the dielet when the asynchronous attack is not detected and performing an authentication mode in which whether the synchronized second counter value is greater than a preset number of times of authentication is verified.

5. The method of claim 4, wherein the sensor status bits information includes information acquired by encrypting the first counter value within the dielet and a random number.

6. The method of claim 5, wherein in the authentication mode, the authentication server acquires the first counter value by decrypting the sensor status bits information based on the secret key and synchronizes the second counter value to match the acquired first counter value.

7. The method of claim 1, wherein the message between the dielet and the authentication server is transferred via the terminal device.

8. A dielet for a supply chain security protocol, the dielet comprising:
    a processor coupled to a memory, the memory storing instructions that, when executed by the processor, cause the dielet to:
    perform a self-generation mode in which an internal counter value is registered in an authentication server of the supply chain security protocol;
    perform a read-out mode that detects whether an asynchronous attack has occurred by comparing the internal counter value with a second counter value stored in the authentication server when a message for communication is sent; and
    replace a message for the communication with a random value when the asynchronous attack is detected,
    wherein the memory is configured to further store the internal counter value, an identifier, and a secret key of symmetric key encryption, and
    wherein in the read-out mode, a difference between a first counter value corresponding to the internal counter value and the second counter value stored in the authentication server is calculated, and it is determined that the asynchronous attack has occurred when an absolute value of the difference is greater than a preset threshold.

9. The dielet of claim 8, wherein in the self-generation mode, the identifier and the secret key are registered in the authentication server along with the internal counter value.

10. The dielet of claim 8, wherein in the read-out mode, the second counter value is acquired by decrypting a response message received from the authentication server based on the secret key.

11. The dielet of claim 10, wherein the response message is an encrypted message including a random number generated in the authentication server and the second counter value.

12. The dielet of claim 11, wherein:
    the processor generates sensor status bits information and sends the sensor status bits information to the authentication server when the asynchronous attack is not detected, and
    the authentication server synchronizes the second counter value based on the sensor status bits information and performs an authentication mode that verifies whether the synchronized second counter value is greater than a preset number of times of authentication.

13. The dielet of claim 12, wherein the sensor status bits information includes information acquired by encrypting the first counter value and the random number.

14. The dielet of claim 12, wherein the authentication server acquires the first counter value by decrypting the sensor status bits information based on the secret key and synchronizes the second counter value to match the acquired first counter value in the authentication mode.

15. The dielet of claim 8, wherein the dielet is inserted into a terminal device, and the message between the dielet and the authentication server is transferred via the terminal device.

* * * * *